(12) United States Patent
Miano et al.

(10) Patent No.: US 11,990,816 B2
(45) Date of Patent: May 21, 2024

(54) CARRIAGE FOR MOVEMENT ON A CABLE AND/OR RAIL

(71) Applicant: ADRENALINE X-TREME ADVENTURES GROUP S.R.L., Marebbe (IT)

(72) Inventors: Samuel Miano, Marebbe (IT); Carlo Trebo, Marebbe (IT)

(73) Assignee: ADRENALINE X-TREME ADVENTURES GROUP S.R.L., Marebbe (IT)

( * ) Notice: Subject to any disclaimer, the term of this patent is extended or adjusted under 35 U.S.C. 154(b) by 319 days.

(21) Appl. No.: 17/355,424

(22) Filed: Jun. 23, 2021

(65) Prior Publication Data

US 2022/0029517 A1 Jan. 27, 2022

(30) Foreign Application Priority Data

Jul. 23, 2020 (IT) .................. 102020000017893

(51) Int. Cl.
*H02K 49/04* (2006.01)
*B61B 3/00* (2006.01)
*B61B 7/00* (2006.01)

(52) U.S. Cl.
CPC ............... *H02K 49/04* (2013.01); *B61B 3/00* (2013.01); *B61B 7/00* (2013.01)

(58) Field of Classification Search
CPC ...... F16D 63/002; F16D 63/008; F16D 59/00; F16D 2127/002; F16D 2121/20;
(Continued)

(56) References Cited

U.S. PATENT DOCUMENTS 6,659,237 B1 12/2003 Pribonic
8,037,978 B1 * 10/2011 Boren ............... H02K 49/04
188/164

(Continued)

FOREIGN PATENT DOCUMENTS

CA        3082464 A1     5/2019
KR    101793203 B1 *    1/2017
(Continued)

OTHER PUBLICATIONS

Office Action from Canadian Patent Application No. 3,124,874, issued Oct. 23, 2023 (including Examination Search Report, Search Report date Oct. 19, 2023), 4 pages.

*Primary Examiner* — Robert A. Siconolfi
*Assistant Examiner* — San M Aung
(74) *Attorney, Agent, or Firm* — Pearne & Gordon LLP; J. Gregory Chrisman (57) ABSTRACT

Described is a carriage (1) for moving on a cable and/or rail comprising: a wheel (2) equipped with its own rotation shaft (3) and configured to rotate on a cable (C) and/or rail; braking masses (4) positioned parallel to the wheel (2) and made of non-magnetic material; magnetic masses (5) configured to generate a magnetic field; and a self-adjusting device (6), connected to the braking masses (4) and positioned inside the rotation shaft (3) of the wheel (2), configured for moving the braking masses (4) close to the magnetic masses (5) along a direction (D) parallel to an axis of extension of the rotation shaft (3), as a function of an increase in a speed of rotation of a wheel (2), in such a way that the magnetic masses (5) generate eddy currents by electromagnetic induction defining a slowing force proportional to the feed speed of the carriage (1).

13 Claims, 5 Drawing Sheets

(58) Field of Classification Search
CPC .. H02K 49/04; H02K 49/046; H02K 2213/09; B60T 8/261; B60T 8/343; B60T 8/3225; B60T 13/745; B60T 13/748; B60T 7/128; B61B 3/00; B61B 7/00; B61H 7/083; B61H 9/02; B60L 7/28; A62B 1/08; Y02T 10/64
USPC .......... 188/165, 164, 161, 156, 158
See application file for complete search history.

(56) References Cited

U.S. PATENT DOCUMENTS

| | | | | |
|---|---|---|---|---|
| 2006/0243545 | A1* | 11/2006 | Chen | B60T 1/10 188/164 |
| 2011/0005861 | A1* | 1/2011 | Uhlig | A62B 35/0093 182/13 |
| 2011/0162917 | A1* | 7/2011 | Steele | B61H 9/02 188/65.1 |
| 2012/0318609 | A1* | 12/2012 | Hartman | A62B 1/08 188/65.1 |
| 2013/0056944 | A1 | 3/2013 | Dewey et al. | |
| 2013/0327591 | A1* | 12/2013 | Galpin | A62B 35/0062 182/15 |
| 2016/0052400 | A1* | 2/2016 | McGowan | B61B 3/00 188/165 |
| 2018/0126287 | A1 | 5/2018 | Wilson et al. | |
| 2019/0109528 | A1 | 4/2019 | Lerner | |
| 2019/0144244 | A1* | 5/2019 | McGowan | B66D 5/06 254/266 |
| 2019/0247693 | A1* | 8/2019 | Yeh | H02K 49/04 |

FOREIGN PATENT DOCUMENTS

| | | | | |
|---|---|---|---|---|
| KR | 101793203 | B1 * | 11/2017 | |
| KR | 102045686 | B1 * | 1/2019 | |
| KR | 102045686 | B1 * | 11/2019 | |
| WO | WO-2022051863 | A1 * | 3/2022 | ............... B60L 5/04 |

\* cited by examiner

CARRIAGE FOR MOVEMENT ON A CABLE AND/OR RAIL

This invention relates to a carriage for movement on a cable and/or rail. The invention also relates to a cable and/or rail equipped with the above-mentioned carriage.

As is known, a system on a cable and/or rail basically comprises a cable/rail which extends between two ends and the carriage allows a user/object to move from one end to the other.

In other words, the carriage is the main component and comprises a pulley equipped with an integrated braking system designed to prevent an excessive speed of forward movement of the carriage along the cable/rail.

The technical purpose of the invention is therefore to provide a carriage for movement on a cable and/or rail which is able to overcome the drawbacks of the prior art.

The aim of the invention is therefore to provide a carriage for movement on a cable and/or rail which allows a suitable and comfortable braking action to be obtained for any user/object using the cable and/or rail.

Ideally, two users with different weights which travel along a cable/rail with the same slope would reach the same arrival speed.

This actually occurs only in cables/rails with low gradients whilst for those with a greater slope the force possessed by the user/object in motion may exceed the braking force of the mechanism which, after reaching the maximum, remains constant resulting in the user/object accelerating.

A further aim of the invention is the use of a brake acting during the route on a cable and/or rail thanks to the centrifugal system and a passive "block" brake, which may be positioned at any point on the route, not only at the end of the cable and/or rail (they can also be inserted along the route). The positive aspect of this coupling is the possibility for the user/object to always reach the same point of the block brake, if it is at the end of the line, or to pass completely safely in the block brake, if it is positioned along the route of the cable/rail.

A further aim of the invention is to provide a carriage for moving on a cable and/or rail which makes it possible to eliminate the carriage set-up times.

The technical purpose indicated and the aims specified are substantially achieved by a movement carriage and a cable and/or rail comprising the technical features described in one or more of the appended claims. The dependent claims correspond to possible embodiments of the invention.

More specifically, the technical purpose indicated and the aims specified are substantially achieved by a carriage for moving on a cable and/or rail comprising at least one wheel equipped with a relative rotation shaft and configured to rotate on a cable and/or rail, braking masses arranged parallel to the wheel and made of non-magnetic material and magnetic masses configured to generate a magnetic field. The carriage also comprises a self-adjusting device, connected to the braking masses and positioned inside the rotation shaft of the at least one wheel, configured for moving the braking masses close to the magnetic masses along a direction parallel to an axis of extension of the rotation shaft, as a function of an increase of a speed of rotation of the at least one wheel, in such a way that the magnetic masses generate eddy currents by electromagnetic induction defining a slowing force proportional to the forward speed of the carriage.

Moreover, the technical purpose indicated and the aims specified are substantially achieved by a cable and/or rail comprising a cable/rail extending between an initial portion and a final portion of the cable and/or rail itself and an above-mentioned carriage configured to move from the initial portion to the final portion of the cable and/or rail with a braking force self-adjusted as a function of a speed of forward movement of the carriage.

Further features and advantages of the invention are more apparent in the non-limiting description which follows of a non-exclusive embodiment of a carriage for movement on a cable and/or rail.

The description is set out below with reference to the accompanying drawings which are provided solely for purposes of illustration without restricting the scope of the invention and in which.

With reference to the accompanying drawings, the numeral 1 denotes in its entirety a movement carriage which, for simplicity of description, will hereafter be referred to as the carriage 1.

The carriage 1 comprises at least one wheel 2 equipped with its own rotation shaft 3 and configured to rotate on a cable/rail C. The term wheel 2 means all those components of the carriage 1 which, in use, allow the user/object to move along the cable and/or rail. In other words, the term wheel 2 may generically indicate a carriage and its components or a pulley of the carriage. The wheel 2 rests at the bottom on the cable/rail "C".

The carriage 1 also comprises a braking system consisting of braking masses 4, magnetic masses 5 and a self-adjusting device 6 which are described in more detail below. The braking system described below is to be considered as interacting with any wheel 2 included in the carriage 1.

The braking masses 4 are positioned parallel to the wheel 2. As shown in the accompanying drawings, the wheel 2 is interposed between the braking masses 4 which are therefore parallel to the lateral surfaces of the wheel 2. The braking masses 4 are made of non-magnetic material, preferably aluminium. Other non-magnetic materials may be used to make the braking masses 4.

Preferably, as shown for example in FIGS. 1A, 1B, 2A, 3A and 4A, the braking masses 4 are made in the form of discs configured to follow a rotation of the wheel 2 and movable with a translation "D" along the axis of extension of the rotation shaft 3. In other words, the braking masses 4 made in the form of discs follow the rotation of the wheel 2 and can be moved by the self-adjusting device 6 (as described in more detail below).

Figure 5:
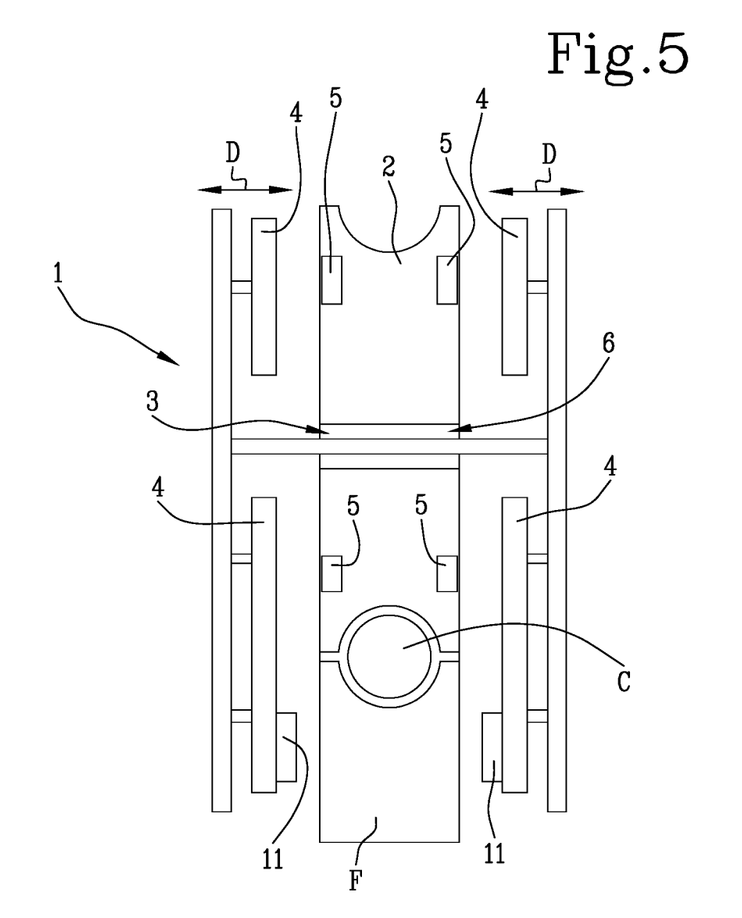
FIG. 5 is a schematic cross section view of a system comprising a carriage and a passive braking system fixed on the cable and/or rail according to the invention.

Preferably, as shown for example in FIG. 5, the braking masses 4 are made in the form of movable plates with a translation along the axis of extension of the rotation shaft 3. In other words, the braking masses 4 made in the form of plates can only be moved by the self-adjusting device 6 (as described in more detail below).

The magnetic masses 5 are configured to generate a magnetic field which, as described in more detail below, when the braking masses 4 are moved towards the magnetic masses 5 will lead to the formation of eddy currents which generate a braking force which will cause a slowing down of the carriage 1 during its forward movement along the cable and/or rail. Preferably, the magnetic masses 5 are permanent magnets.

Figure 1A:
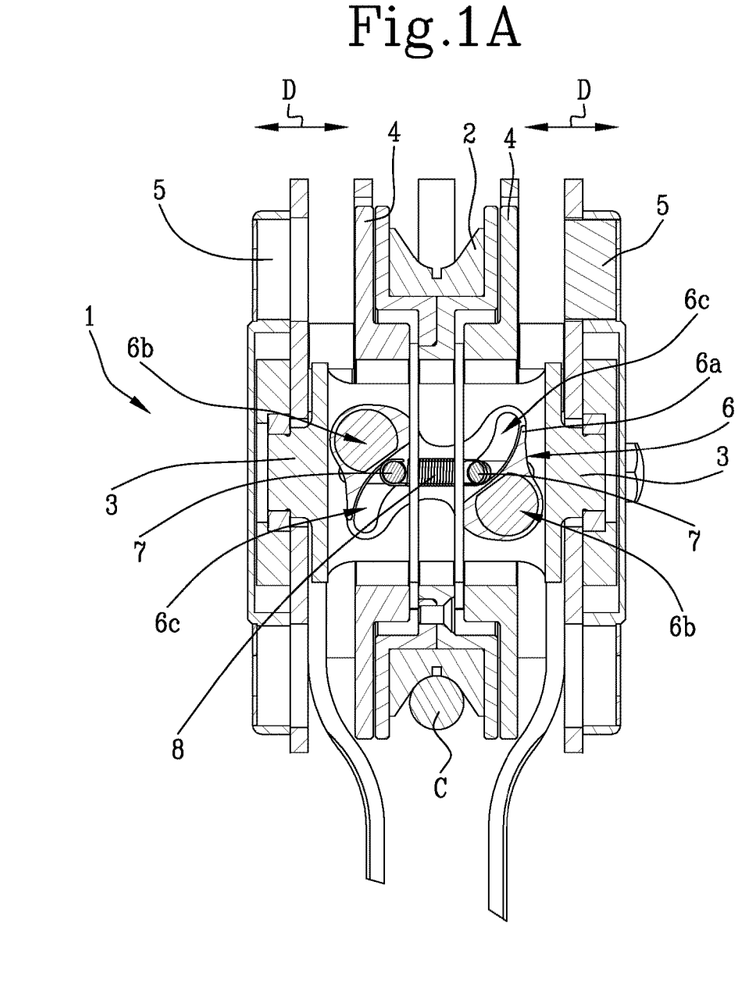
FIGS. 1A and 1B are schematic cross sections of a first embodiment of the carriage according to the invention.
Figure 1B:
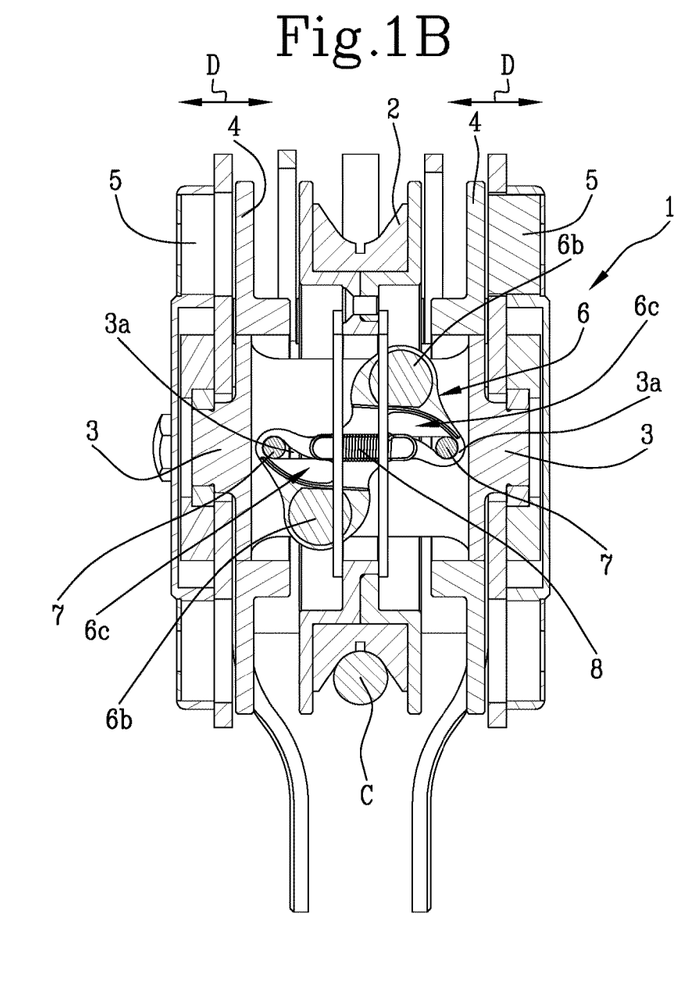

Preferably, the braking masses 4 are interposed between the at least one wheel 2 and the magnetic masses 5 as, for example, shown in FIG. 1A and in FIG. 1B.

Preferably, the magnetic masses 5 are interposed between the braking masses 4. In other words, the magnetic masses 5 may be positioned close to the wheel 2 in such a way as to be interposed in the inner space of the carriage 1 interposed between the braking masses 4. Even more preferably, as for example shown in FIG. 5, the magnetic masses 5 are integrated in the at least one wheel 2.

The self-adjusting device 6 is positioned inside the rotation shaft 3 of the at least one wheel 2 and is connected to the braking masses 4. Preferably, for each wheel 2 of the carriage 1 there are braking masses 4 and self-adjusting devices 6.

The self-adjusting device 6 is configured for moving the braking masses 4 close to the magnetic masses 5 along a direction "D" parallel to the axis of extension of the rotation shaft 3 (that is to say, the axis of rotation of the rotation shaft 3).

More specifically, the self-adjusting device 6 is configured for moving the braking masses 4 according to a variation of the speed of rotation of the wheel 2. Yet more specifically, the self-adjusting device 6 moves the braking masses 4 towards the magnetic masses 5 according to an increase in the speed of rotation of the at least one wheel 2.

In other words, irrespective of how the carriage 1 is shaped (that is, on the basis of how the braking masses 4 are located relative to the magnetic masses 5), the self-adjusting device 6 is configured for moving the braking masses 4 in such a way that they move towards the magnetic masses 5 moving away from the wheel 2 or moving towards the wheel 2.

In that way, the magnetic masses 5 generate eddy currents by electromagnetic induction defining a slowing force proportional to the advancing speed of the carriage 1. In other words, when the non-magnetic braking masses 4 are close to the magnetic masses 5, they are immersed in the magnetic field generated by the magnetic masses 5, resulting in a variation of the magnetic field which generates the eddy currents.

Advantageously, since the movement of the braking masses 4 by the self-adjusting device 6 is proportional to the speed of rotation of the wheels 2, the braking force will also be proportional to the speed of rotation of the wheels 2. In that way, it is possible to adjust the braking force autonomously and independently of the user/object moving along the cable and/or rail using the carriage 1.

Advantageously, the carriage 1 is able to obtain a braking action suitable and comfortable for any user/object travelling along the cable and/or rail.

Advantageously, the carriage 1 makes it possible to eliminate the set-up times of the carriage 1 since the adjustment of the braking force occurs automatically as a function of the speed of movement of the carriage 1.

With reference, for example, to the embodiment of FIGS. 1A and 1B, the self-adjusting device 6 comprises a cam 6a equipped with centrifugal masses 6b. When the speed of rotation of the wheel 2 varies, the cam 6a performs a rotation inside the rotation shaft 3 in such a way as to move the braking masses 4 (which in FIGS. 1A and 1B are in the form of discs) relative to the magnetic masses 5.

In other words, the cam 6a is configured to perform a rotation with the variation in the speed of rotation of the wheel 2 due to the presence of the centrifugal masses 6b suitably positioned on the cam 6a relative to an axis of rotation of the cam 6a.

As shown in FIGS. 1A and 1B, the rotation of the cam 6a causes the braking masses 4 to move away from the wheel 2 with consequent moving towards the magnetic masses 5. The movement of the braking masses 4 towards the magnetic masses 5 leads to the generation of eddy currents proportional to the speed of rotation of the wheel 2 (that is, the distance between the braking masses 4 and the magnetic masses 5).

The cam 6a is connected to the braking masses 4 by suitable pins 7 which, due to the rotation of the cam 6a, result in a movement along the axis "D" parallel to the axis of rotation of the braking masses 4.

Preferably, the rotation shaft 3 is equipped with suitable guides 3a which allow a translation of the pins 7 by the self-adjusting device 6. The guides 3a are present in all the embodiments of the invention which comprise the use of the pins 7.

The cam 6a is also equipped with suitable guides 6c which allow the pins 7 to move.

Preferably, the self-adjusting device 6 comprises a return spring 8 configured to return the self-adjusting device 6 to a rest position when the speed of rotation is zero. In other words, if the speed is zero, the self-adjusting device 6 (that is, the cam), is kept in a position of minimum braking force to allow the automatic repositioning of the braking masses 4.

Figure 2A:
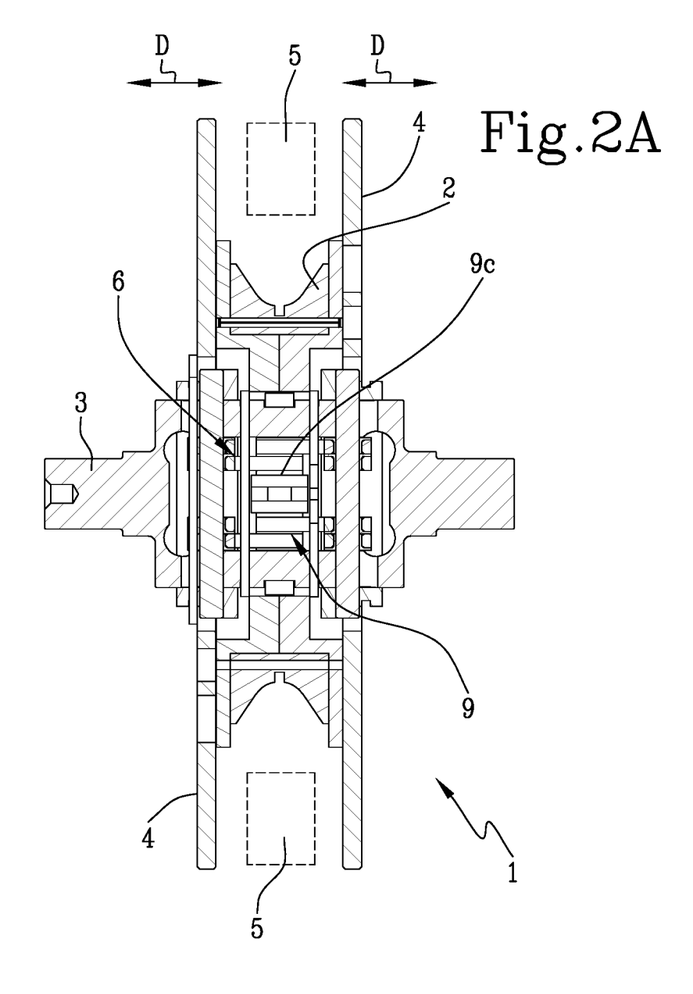
FIGS. 2A and 2B are schematic cross sections of a further embodiment of the carriage according to the invention.
Figure 2B:
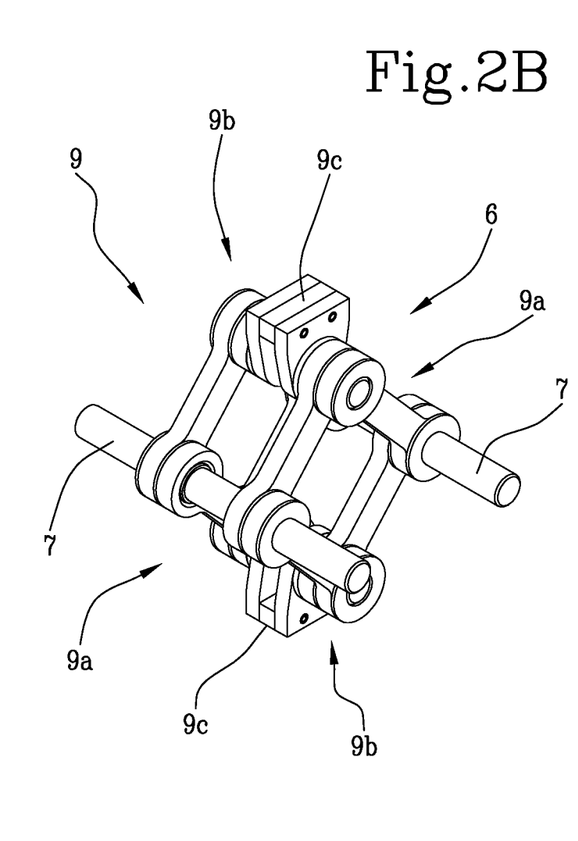

Preferably, as shown in FIGS. 2A and 2B, the self-adjusting device 6 comprises a crank structure 9 defining two portions 9a connected to the braking masses 4 by suitable pins 7 and two portions 9b equipped with weights 9c. The crank structure 9 is configured for reciprocally translating the ends connected to the braking masses 4 in such a way as to move them relative to the magnetic masses 5.

In the embodiment of FIGS. 2A and 2B, with the increase in the speed of rotation of the wheel 2, the portions 9b are moved away by the force generated by the weights 9c, from a central portion of the crank structure 9. This moving away leads to a moving of the portions 9a towards the central portion of the crank structure 9 which, by means of the pins 7, moves the braking masses 4 towards the magnetic masses 5 (that is, towards the wheel 2). In FIG. 2A the position of the magnetic masses 5 is shown by way of example; they might, for example, be located inside the wheel 2.

Figure 3A:
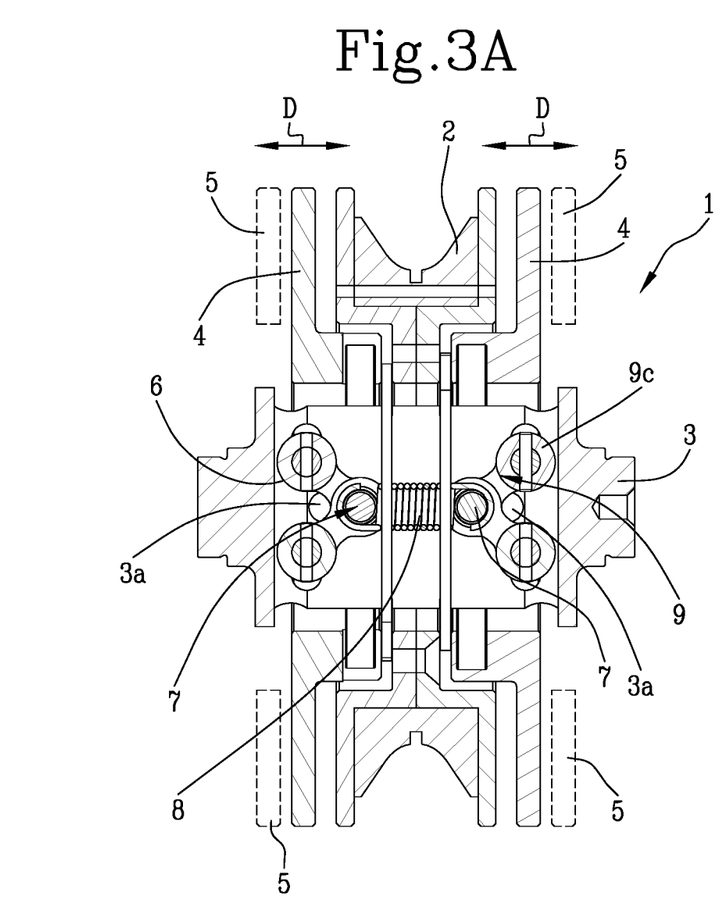
FIGS. 3A and 3B are schematic cross sections of a further embodiment of the carriage according to the invention.
Figure 3B:
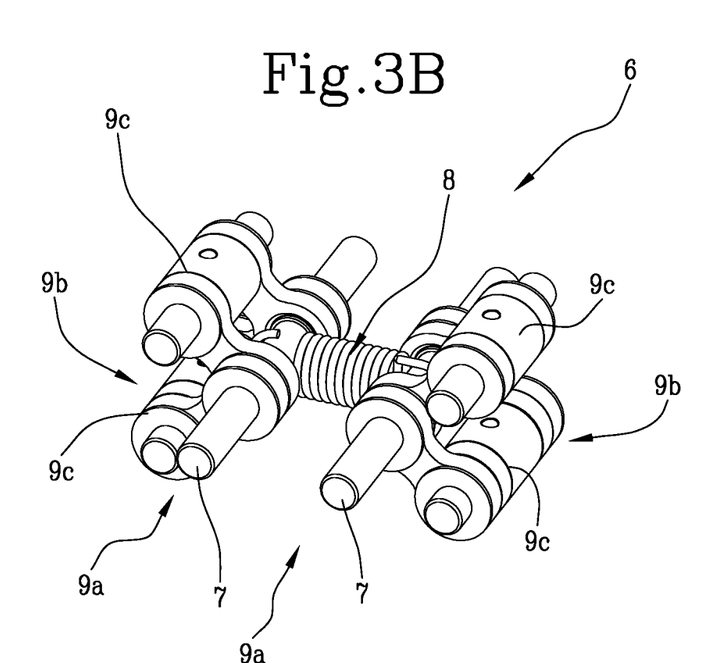

Preferably, as shown in FIGS. 3A and 3B, the self-adjusting device 6 comprises a crank structure 9 defining two portions 9a connected to the braking masses 4 by suitable pins 7 and four portions 9b equipped with weights 9c. The crank structure 9 is configured for reciprocally translating the ends connected to the braking masses 4 in such a way as to move them relative to the magnetic masses 5.

In the embodiment of FIGS. 3A and 3B, with the increase in the speed of rotation of the wheel 2, the portions 9b will be moved away, by the force generated by the weights 9c. Consequently, there will also be a movement away of the portions 9a which, by means of the pins 7, move the braking masses 4 towards the magnetic masses 5, similarly to what is described for the embodiment of FIGS. 1A and 1B. In other words, in this embodiment the magnetic masses 5 are positioned in such a way that both the braking masses 4 and the wheel 2 are interposed between the magnetic masses 5 (as schematically illustrated in FIG. 3A).

According to this embodiment, the crank structure 9 comprises a return spring 8, connected to the portions 9a (that is, to the pins 7) configured to return the self-adjusting device 6 to a rest position when the speed of rotation is zero.

Figure 4A:
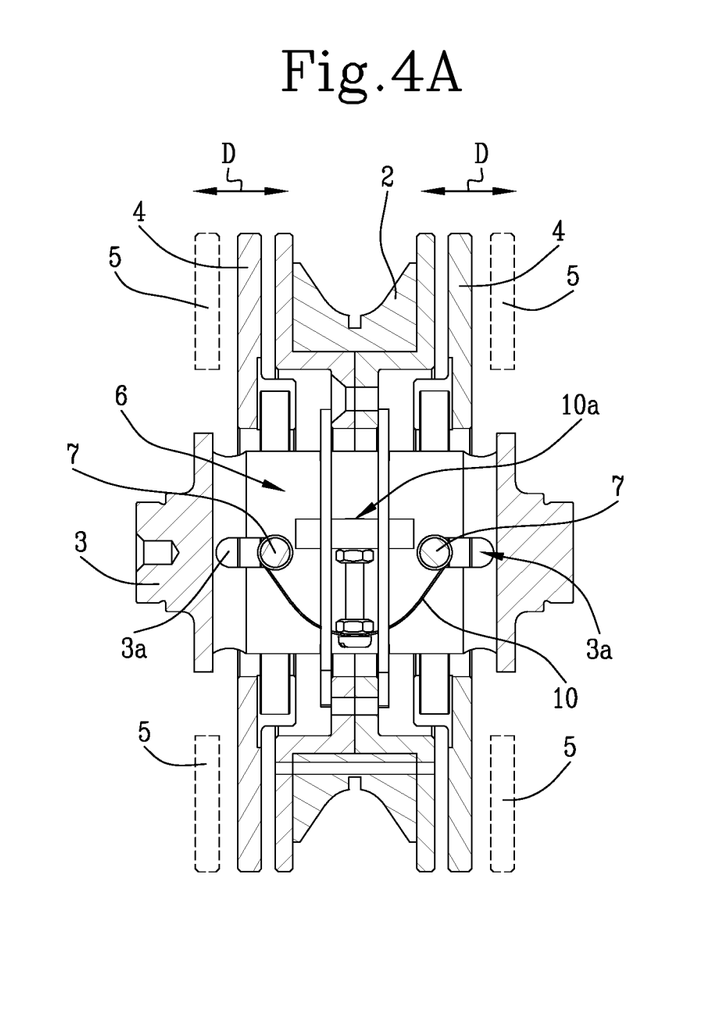
FIGS. 4A and 4B are schematic cross sections of a further embodiment of the carriage according to the invention.
Figure 4B:
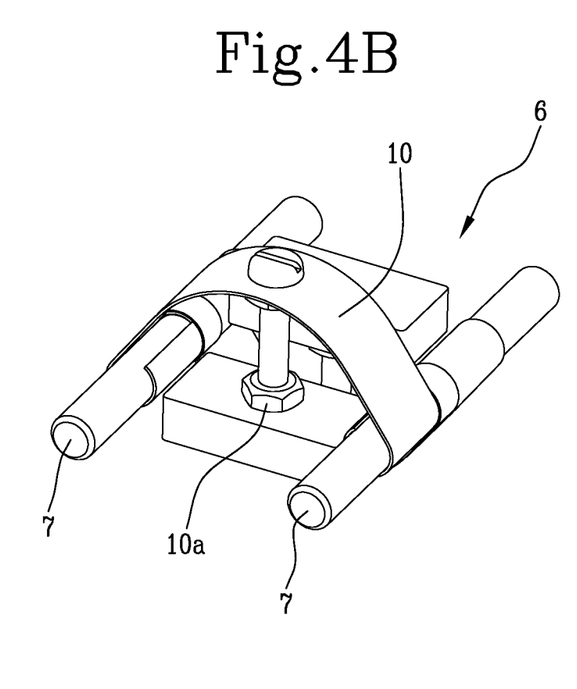

Preferably, as shown for example in FIGS. 4A and 4B, the self-adjusting device 6 comprises a harmonic steel sheet 10 the ends of which are connected to the braking masses 4. The self-adjusting device 6 also comprises a centrifugal mass 10a connected or connectable to a central portion of the harmonic steel sheet 10. During a rotation of the wheel 2, with the increase in the speed there will be a rotation of the centrifugal mass 10a which results in the harmonic steel sheet 10 moving the pins 7. In other words, the harmonic steel sheet 10 is connected to the braking masses 4 by the pins 7 which are moved in the guides 3a so as to move the braking masses 4 away from the wheel 2 and therefore move them towards the magnetic masses 5.

The harmonic steel sheet 10 is also configured to return the self-adjusting device 6 to a rest position when the speed of rotation is zero, that is to say, to a position of minimum braking effect of the braking masses 4.

Preferably, according to an embodiment not illustrated, the self-adjusting device 6 may comprise at least one sensor configured for reading the number of revolutions of the wheel 2 and an electric piston connected to the sensor and configured for moving the braking masses 4 as a function of the number of revolutions of the wheel 2. In other words, the sensor can perceive an increase in the speed of rotation of the wheel 2 and send a signal to the electric piston which will therefore be operated to move the braking masses 4 in proportion to the increase in the speed of rotation.

Preferably, in a further embodiment, not illustrated, of the carriage 1, the self-adjusting device 6 comprises at least one pump and a hydraulic piston. The pump is driven by the wheel 2 and is configured to move the piston in order to move the braking masses 4. In other words, with the increase in the revolutions of the wheel 2, the pump sends a greater flow to the hydraulic piston, moving the braking masses 4 towards the magnetic masses 5.

Advantageously, the carriage 1 described above (both at a general level and in the individual embodiments) allows an automated adjustment of the braking force on the basis of the speed of the carriage 1 due to the weight of the user/object. In this way, the carriage 1 is able to prevent an excessive speed and allow or eliminate completely the human error during adjustment of the speed of the wheels 2 of the carriage 1.

This invention also relates to a system on cable and/or rail comprising a cable "C" and/or a rail which extends between an initial portion and an end portion of the route.

The cable and/or rail also comprises a carriage 1 as described above and configured to rest on the cable "C" and/or rail and to move from the initial portion to the final portion of the cable and/or rail with a self-adjusted braking force according to the speed of forward movement of the carriage 1.

As shown for example in FIG. 5, the cable and/or rail also comprises a block braking system "F". The block braking system "F" may also, but not necessarily, be positioned in the final portion of the cable and/or rail and comprises at least one module made of non-magnetic material applied to the cable "C" and/or rail.

More in detail, it is possible to also position the blocks "F" at predetermined points of the route. Since the block brake "F" according to the invention is in any case triggered only above a speed threshold, the proposed system prevents the case that a user/object stops along the route and therefore remains "blocked".

In this embodiment, the braking masses 4 (shown in the form of plates) have an extension greater than an extension of the wheel 2 (with reference to the portion of the wheel 2 which rests on the cable "C" and/or rail, that is to say, the lower portion of the wheel 2) and are equipped with further magnetic masses 11 configured to interact with the block braking system "F" in such a way as to generate eddy currents by electromagnetic induction defining a further slowing force proportional to the speed of forward movement of the carriage 1.

The braking masses 4 in the form of plates allow them to be disengaged from the rotation of the wheel 2 and to translate solely along the direction "D" parallel to the axis of the wheel 2 (that is, of the rotation shaft 3).

In this embodiment, the magnetic masses 5 of the carriage 1 are integrated with the wheel 2.

Advantageously, this embodiment integrates the self-adjusting device 6 (as well as the other components of the carriage 1) with the block braking system "F". Advantageously, the block braking system "F" makes it possible to obtain an autonomous braking system without the need to have an electricity supply.

Depending on the slope of the cable/rail it is also possible to design the length of the block braking system "F" in such a way that the user/object, whatever its weight, may be braked in a gradual and safe manner in every situation. This solution can be potentially used also in the production of vertical brakes.

The braking force generated by the block braking system "F" and the further magnetic masses 11 is proportional to the speed of arrival of the carriage 1 in the final portion of the cable and/or rail, so to the speed with which the carriage 1 engages the block braking system "F".

Advantageously, during the entire route along the cable and/or rail, the user/object is braked by the eddy currents generated by the interaction of the braking masses 4 and the magnetic masses 5, moved towards each other thanks to the self-adjusting device 6. The greater the speed the more the braking masses 4 are moved towards the magnetic masses 5.

Once the block braking system "F" has been reached, a further braking is obtained by the further magnetic masses 11 which interact with the block braking system "F", further braking the user/object.

It should be noted that the coupling of brake acting on the carriage 1 and passive brake acting on cable/rail allows the simultaneous descent of several persons/objects on the same route because an interference of the carriages 1, that is, a collision between persons/objects, is made impossible by the system; in fact, the invention always guarantees braking irrespective of the number of persons/objects using the system at a given moment, with obvious advantages in terms of safety and productivity of the system.

Advantageously, the invention is able to overcome the drawbacks of the prior art.

Advantageously, this invention makes it possible to obtain a slowing effect of the carriage along the cable and/or rail which is gradual and proportional to the speed of forward movement of the carriage 1.

Advantageously, this invention makes it possible to obtain a self-adjustment of the braking force, reducing to a minimum the human error and adapting the braking force to any user/object and/or slope of the cable and/or rail.

The invention claimed is:

1. A carriage for moving in a cable and/or a rail comprising:
   at least one wheel equipped with its own rotation shaft and configured to rotate on a cable and/or a rail;
   braking masses positioned parallel to said wheel and made of non-magnetic material;
   magnetic masses configured to generate a magnetic field; and
   a self-adjusting device, connected to said braking masses and positioned inside said rotation shaft of the at least one wheel, configured for moving said braking masses close to said magnetic masses along a direction parallel to an axis of extension of the rotation shaft, as a function of an increase in a speed of rotation of said at least one wheel, in such a way that said magnetic masses generate eddy currents by electromagnetic induction defining a slowing force proportional to the feed speed of the carriage.

2. The carriage according to claim 1, wherein the self-adjusting device comprises a cam, equipped with centrifugal masses, configured to perform a rotation with variations in the speed of rotation of the wheel in such a way as to move said braking masses towards said magnetic masses.

3. The carriage according to claim 1, wherein said self-adjusting device comprises a crank structure defining at least two portions connected to said braking masses and at least two portions equipped with weights, said crank structure being configured for achieving a reciprocal translation of the portions connected to the braking masses in such a way as to move them towards said magnetic masses.

4. The carriage according to claim 2, wherein said self-adjusting device comprises a return spring configured to return the self-adjusting device to a rest position when said speed of rotation is zero.

5. The carriage according to claim 1, wherein the said—adjusting device comprises a sheet of harmonic steel, the ends of which are connected to the braking masses, and a centrifugal mass connected or connectable to a central portion of the sheet of harmonic steel.

6. The carriage according to claim 1, wherein said self-adjusting device comprises at least one sensor configured for reading the number of revolutions of the wheel and an electric piston connected to the sensor and configured for moving the braking masses as a function of the number of revolutions.

7. The carriage according to claim 1, wherein said self-adjusting device comprises at least a pump and a hydraulic piston, said pump being driven by the wheel for moving said piston so as to move said braking masses.

8. The carriage according to claim 1, wherein said braking masses are interposed between said at least one wheel and said magnetic masses.

9. The carriage according to claim 1, wherein said magnetic masses are interposed between said braking masses, said magnetic masses being integrated in said at least one wheel.

10. The carriage according to claim 1, wherein said braking masses are made in the form of discs configured to follow a rotation of the wheel and movable, by means of the self-adjusting device, with a translation along the axis of extension of the rotation shaft.

11. The carriage according to claim 1, wherein said braking masses are made in the form of movable plates, by means of the self-adjusting device, with a translation along the axis of extension of the rotation shaft.

12. A cable and/or rail comprising a cable and/or rail extending between an initial portion and a final portion of the cable and/or rail and a carriage according to claim 1 configured to move from the initial portion to the final portion of the cable and/or rail with a braking force self adjusted as a function of a feed speed of said carriage.

13. The cable and/or rail according to claim 12, also comprising a block braking system wherein said braking masses have an extension greater than an extension of the wheel and are equipped with further magnetic masses configured to interact with said block braking system in such a way as to generate eddy currents by electromagnetic induction defining a further slowing force proportional to the feed speed of the carriage.

* * * * *